(12) United States Patent
Hattori (10) Patent No.: US 11,565,487 B2
(45) Date of Patent: Jan. 31, 2023

(54) REPAIR DEVICE AND COMPOSITE MATERIAL REPAIR METHOD

(71) Applicant: MITSUBISHI HEAVY INDUSTRIES, LTD., Tokyo (JP)

(72) Inventor: Hidetaka Hattori, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 414 days.

(21) Appl. No.: 16/795,626

(22) Filed: Feb. 20, 2020

(65) Prior Publication Data

US 2020/0324495 A1 Oct. 15, 2020

(30) Foreign Application Priority Data

Apr. 12, 2019 (JP) .............................. JP2019-076052

(51) Int. Cl.
*B29C 73/12* (2006.01)
*B29C 73/02* (2006.01)

(52) U.S. Cl.
CPC ............ *B29C 73/12* (2013.01); *B29C 73/025* (2013.01)

(58) Field of Classification Search
CPC .............................. B29C 73/12; B29C 73/025
See application file for complete search history.

(56) References Cited

U.S. PATENT DOCUMENTS

| 2006/0158001 A1 | 7/2006 | Emch et al. |
| 2011/0204534 A1* | 8/2011 | Kanemasu .......... B29C 43/3642 425/13 |
| 2015/0314577 A1 | 11/2015 | Dan-Jumbo |
| 2019/0351624 A1* | 11/2019 | Huang ................. B32B 25/042 |

FOREIGN PATENT DOCUMENTS

| EP | 2939822 A1 | 11/2015 | |
| JP | 2006187897 A | * 7/2006 | ............ B29C 73/02 |
| JP | 2006187897 A | 7/2006 | |
| JP | 2009208351 A | 9/2009 | |
| JP | 2015212072 A | 11/2015 | |

OTHER PUBLICATIONS

Machine translation of JP 2006-187897 (Year: 2006).*
Extended European Search Report for European Application No. 20158901.7 dated Oct. 12, 2020—9 pages.

* cited by examiner

*Primary Examiner* — Jeffry H Aftergut
*Assistant Examiner* — Jaeyun Lee
(74) *Attorney, Agent, or Firm* — Kanesaka Berner and Partners LLP (57) ABSTRACT

A repair device is a device configured to repair a plate-shaped composite material formed by laminating fiber-reinforced resin sheets. The repair device includes a main body portion that covers a portion to be repaired that is formed in an end surface configured to connect plate surfaces of the composite material so as to be recessed from the end surface such that a closed space is formed between the end surface and the main body portion, a securing portion configured to secure the main body portion to the composite material, and a resin supply portion configured to inject a resin into the closed space with a pressure. The main body portion is formed of a member with rigidity that is not deformed due to the pressure from the resin supply portion.

7 Claims, 2 Drawing Sheets

REPAIR DEVICE AND COMPOSITE MATERIAL REPAIR METHOD

RELATED APPLICATIONS

The present application claims priority from Japanese Application Number 2019-076052 filed Apr. 12, 2019, the disclosure of which is hereby incorporated by reference herein in its entirety.

TECHNICAL FIELD

The present invention relates to a repair device and a composite material repair method.

BACKGROUND ART

If a plate-shaped composite material, which is formed by laminating fiber-reinforced resin sheets obtained by causing reinforced-fiber to be impregnated with a resin, receives impact on an end portion thereof in a direction that perpendicularly intersects a plate thickness direction, delamination may occur starting from the end portion, and gaps may be generated between layers. In other words, the composite material may be brought into a damaged state. If the composite material is continuously used in the damaged state, there is a probability that the gaps between the layers advance in a direction toward the inside of the composite material, and the composite material cannot provide predetermined strength and rigidity. In order to solve such a problem, there is known a technique for repairing a composite material by causing a resin to flow into gaps generated between layers to fill in the gaps in a case in which a damages such as delamination starting from an end point occurs (Japanese Unexamined Patent Application, Publication No. 2006-187897, for example).

Japanese Unexamined Patent Application, Publication No. 2006-187897 describes a method for repairing a defective portion of a composite material in which a region in a periphery of an opening portion of a gap defective portion formed in a composite material panel is covered with a bagging film that serves as a covering material, and a sealant is disposed in a periphery of the covered portion, thereby bringing a specific space surrounded by the composite material panel and the bagging film into an air-tight state. According to the method, a vacuum fitting is provided in the bagging film, a suctioning device is connected to the vacuum fitting, and air is evacuated (vacuumed) from the specific space using the suctioning device, and the pressure in the specific space is set to a predetermined vacuum pressure. Then, a resin in a liquid form is caused to flow into the gap defective portion via an opening using the vacuum pressure in the specific space.

CITATION LIST

Patent Citation

Patent Citation 1: Japanese Unexamined Patent Application, Publication No. 2006-187897

SUMMARY OF INVENTION

Technical Problem

Since the gap generated due to delamination of the composite material is a minute gap, a pressure loss is large, and it is difficult to inject a resin with viscosity. Although the resin is caused to flow into the gap in the composite material using the vacuum pressure in the method disclosed in Japanese Unexamined Patent Application, Publication No. 2006-187897, it may not be possible to suitably cause the resin to flow into the gap with the vacuum pressure since the gap is minute as described above.

In the method disclosed in Japanese Unexamined Patent Application, Publication No. 2006-187897, it is also considered that the resin is injected while being pressurized in order to inject the resin into the gap in the composite material with a higher pressure. However, since the specific space is formed through the covering with the bagging film in the method disclosed in Japanese Unexamined Patent Application, Publication No. 2006-187897, the bagging film is deformed due to a pressure, and the pressure does not suitably act on the gap in the composite material in a case in which it is attempted to inject the resin in a pressurized manner. Therefore, there is a probability that the resin cannot be caused to flow into the gap.

The invention has been made in view of such circumstances, and an object thereof is to provide a repair device and a composite material repair method capable of filling a portion to be repaired in the composite material with a resin and repairing the portion to be repaired even in a case in which the portion to be repaired is minute cracking, a gap, or the like having a shape into which the resin is difficult to flow.

Solution to Problem

In order to solve the aforementioned problem, a repair device and a composite material repair method according to the invention employ the following solutions.

According to a first aspect of the invention, there is provided a repair device that repairs a plate-shaped composite material formed by laminating fiber-reinforced resin sheets, the repair device including: a main body portion configured to cover a portion to be repaired that is formed in an end surface of the composite material such that a closed space is formed between the end surface and the main body portion; a securing portion configured to secure the main body portion to the composite material; and a resin supply portion configured to inject a resin into the closed space with a pressure, in which the main body portion is formed of a member with rigidity that is not deformed due to the pressure from the resin supply portion.

In the aforementioned configuration, the resin is injected to the closed space between the main body portion that is secured to the composite material and covers the portion to be repaired and the portion to be repaired with the pressure. If the resin is injected into the closed space, the closed space is filled with the resin, and the inside of the portion to be repaired is also filled with the resin from the closed space. Since the composite material and the main body portion are secured, the pressure in the closed space increases if the resin is further supplied to the closed space in a state in which the closed space is filled with the resin. If the pressure in the closed space increases, the pressure acts on the resin flowing into the portion to be repaired. In this manner, the resin suitably flows into the portion to be repaired. With the aforementioned configuration, it is thus possible to facilitate the flowing of the resin into the portion to be repaired. Therefore, even in a case in which the portion to be repaired of the composite material is minute cracking, a gap, or the like having a shape into which the resin is difficult to flow, it is possible to fill the inside of the portion to be repaired with the resin and to repair the portion to be repaired.

In the aforementioned configuration, the main body portion is formed of the member with rigidity that is not deformed due to the pressure from the resin supply portion. In this manner, since the main body portion is not deformed, it is possible to inject the resin into the closed space with the pressure. By injecting the resin into the closed space with a pressure, it is possible to cause the pressure to act on the resin flowing into the portion to be repaired. Therefore, it is possible to suitably fill the inside of the portion to be repaired with the resin.

Note that examples of the member with rigidity that is not deformed due to the pressure from the resin supply portion include a metal member and a resin member. Also, "the member is not deformed" means that the member is not deformed to such an extent that the member cannot serve functions as the main body portion, and it is a matter of course that slight deformation is acceptable.

Also, the repair device according to the aspect of the invention may further include: a evacuate portion configured to evacuate air from the closed space to make the closed space vacuum.

In the aforementioned configuration, the repair device includes: a evacuate portion that evacuates air from the space to make the closed space vacuum. In this manner, it is possible to evacuate the air from the closed space and the portion to be repaired. Therefore, it is possible to curb inhibition due to the air when the resin is caused to flow into the portion to be repaired. Thus, it is possible to more suitably fill the inside of the portion to be repaired with the resin and thereby to more suitably repair the portion to be repaired.

Note that the vacuum may not necessarily be a complete vacuum state and may be a state in which the pressure is lower than the atmospheric pressure.

In the repair device according to the aspect of the invention, the securing portion may include a first contact portion integrally provided with the main body portion and configured to be brought into surface contact with one surface that is a plate surface of the composite material on one side, a second contact portion integrally provided with the main body portion and configured to be brought into surface contact with the other surface of a plate surface of the composite material on the other side, and a pressurizing portion configured to pressurize the first contact portion in a direction of the one surface of the composite material and pressurize the second contact portion in a direction of the other surface of the composite material.

In the aforementioned configuration, the first contact portion integrally provided with the main body portion and the one surface of the composite material are brought into surface contact, and the second contact portion integrally provided with the main body portion and the other surface of the composite material are brought into surface contact. Therefore, it is possible to cause a pressure loss between the main body portion and the composite material to increase and thereby to curb leakage of the resin from a portion between the main body portion and the composite material.

Also, the pressurizing portion pressurizes the first contact portion in the direction of the one surface of the composite material and pressurizes the second contact portion in the direction of the other surface of the composite material. In other words, the securing portion secures the composite material to the main body portion such that the composite material is sandwiched between the first contact portion and the second contact portion. In this manner, it is possible to further curb leakage of the resin from the portion between the main body portion and the composite material.

In the repair device according to the aspect of the invention, the securing portion may include a first contact portion integrally provided with the main body portion and configured to be brought into surface contact with one surface that is a plate surface of the composite material on one side and a second contact portion integrally provided with the main body portion and configured to be brought into surface contact with the other surface of a plate surface of the composite material on the other side, the first contact portion may be biased on a side of the one surface in a state in which the first contact portion is in contact with the one surface of the composite material, and the second contact portion may be biased on a side of the other surface in a state in which the second contact portion is in contact with the other surface of the composite material.

In the aforementioned configuration, the first contact portion integrally provided with the main body portion and the one surface of the composite material are brought into surface contact, and the second contact portion integrally provided with the main body portion and the other surface of the composite material are brought into surface contact. Therefore, it is possible to cause the pressure loss between the main body portion and the composite material to increase and thereby to curb leakage of the resin from the portion between the main body portion and the composite material.

Also, the first contact portion is biased on the side of the one surface in a state in which the first contact portion is in contact with the one surface of the composite material, and the second contact portion is biased on the side of the other surface in a state in which the second contact portion is in contact with the one surface of the composite material. In other words, the securing portion is secured the composite material to the main body portion such that the composite material is sandwiched between the first contact portion and the second contact portion. In this manner, it is possible to further curb leakage of the resin from the portion between the main body portion and the composite material.

In the aforementioned configuration, no special device is provided in order to bring the first contact portion and the second contact portion into contact with the composite material. Therefore, it is possible to reduce the number of components and to achieve a simple configuration as compared with a case in which a special device is provided in order to bring the first contact portion and the second contact portion into contact with the composite material.

In the repair device according to the aspect of the invention, sealing members may be provided between the first contact portion and the one surface of the composite material and between the second contact portion and the other surface of the composite material.

In the aforementioned configuration, the sealing members are provided between the first contact portion and the one surface of the composite material and between the second contact portion and the other surface of the composite material. In this manner, since the resin that is about to leak from the portion between the main body portion and the composite material is blocked with the sealing members, it is possible to further curb leakage of the resin from the portion between the main body portion and the composite material.

The repair device according to the aspect of the invention may further include: a heating mechanism configured to heat the resin injected into the closed space.

By using the heating mechanism in the aforementioned configuration, it is possible to enhance fluidity of the resin by heating the resin with which the closed space is filled. Therefore, it is possible to facilitate filling of the inside of the portion to be repaired with the resin and to facilitate hardening of the resin with which the inside of the portion to be repaired is filled.

According to an aspect of the invention, there is provided a composite material repair method for repairing a plate-shaped composite material formed by laminating fiber-reinforced resin sheets, the method including: a covering process of covering a portion to be repaired that is formed in an end portion of the composite material with a main body portion such that a closed space is formed between the portion to be repaired and the main body portion; a securing process of securing the main body portion to the composite material; and an injection process of injecting a resin into the closed space with a pressure after the covering process and the securing process, and the main body portion is formed of a member with rigidity that is not deformed due to the pressure of the resin injected in the injection process.

Advantageous Effect of Invention

According to the invention, it is possible to fill the portion to be repaired with the resin and to repair the portion to be repaired of the composite material even in a case in which the portion to be repaired is minute cracking, a gap, or the like having a shape into which the resin is difficult to flow.

DESCRIPTION OF EMBODIMENTS

Hereinafter, embodiments of a repair device and a composite material repair method according to the invention will be described with reference to the drawings.

First Embodiment

Figure 1:
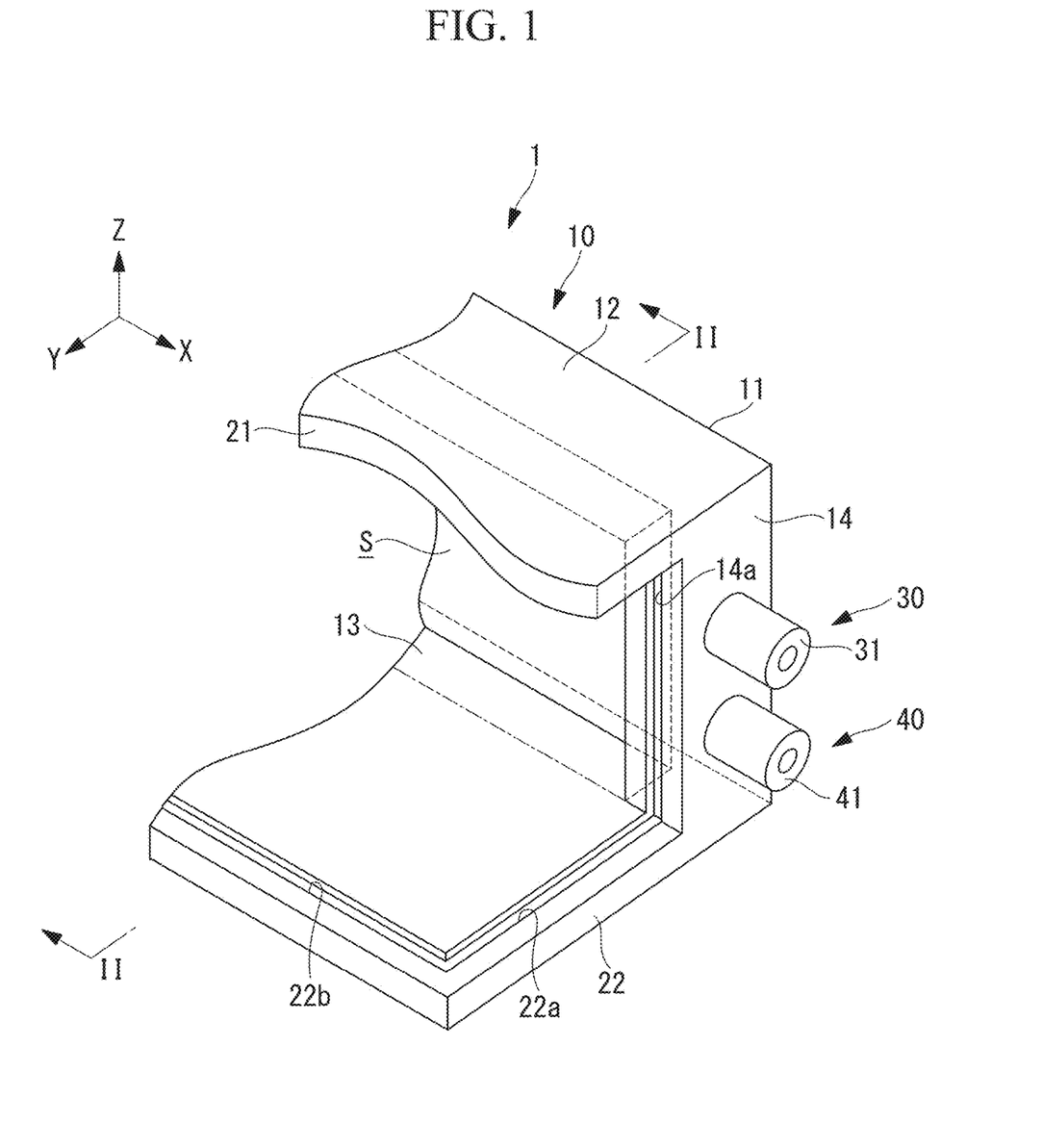
FIG. 1 is a perspective view of a repair device according to a first embodiment of the invention.
Figure 2:
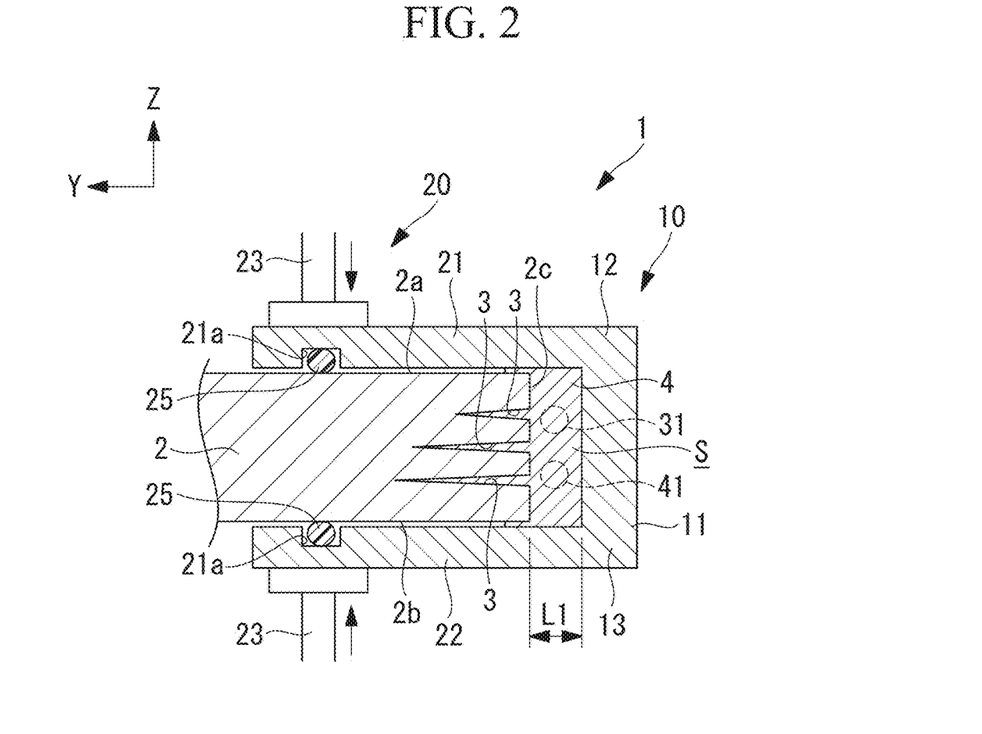
FIG. 2 is a sectional view in the direction of the arrow II-II in FIG. 1.

Hereinafter, a first embodiment of the invention will be described using FIGS. 1 and 2. Note that FIG. 1 illustrates only a repair device. FIG. 2 illustrates a state in which a composite material is placed in the repair device and a closed space is filled with a resin. The following description will be given on the assumption that a plate thickness direction of the composite material in a state in which the composite material is placed in the repair device is defined as a Z-axis direction, and a direction, which perpendicularly intersects the Z-axis direction, in which the resin is injected, is defined as an X-axis direction, and a direction that perpendicularly intersects the Z-axis direction and the X-axis direction is defined as a Y-axis direction, as illustrated in FIGS. 1 and 2.

A repair device 1 according to the embodiment is a device configured to repair a plate-shaped composite material 2 (for example, a molded article using a prepreg) formed by laminating fiber-reinforced resin sheets as illustrated in FIGS. 1 and 2. Specifically, the repair device 1 is a device configured to fill the inside of a portion to be repaired 3 with a resin 4 by injecting the resin 4 into the portion to be repaired 3 that is formed so as to be recessed from an end surface 2c that connects plate surfaces of the plate-shaped composite material 2. Examples of the portion to be repaired 3 include a gap, cracking, and the like formed between fiber-reinforced resin sheets due to peeling of the laminated fiber-reinforced resin sheets starting from the end surface 2c.

The repair device 1 includes a main body portion 10 configured to cover the portion to be repaired 3 such that a closed space S is formed between the end surface 2c and the main body portion 10, a securing portion 20 configured to secure the main body portion 10 to the composite material 2, a resin supply portion 30 configured to inject the resin 4 into the closed space S with a pressure, and a evacuate portion 40 configured to evacuate air from the space to make the closed space S vacuum.

The main body portion 10 is a box-shaped member that has a rectangular parallelepiped outer shape, inside which a space is formed. Also, an opening is formed over substantially an entire region at an end portion of the main body portion 10 on one side in the Y-axis direction. In other words, the space formed inside the main body portion 10 is in an opened state with the opening, in a state in which the composite material 2 is not placed in the repair device 1. Meanwhile, the end surface 2c of the composite material 2 blocks the opening in a state in which the composite material 2 is placed in the repair device 1. Therefore, the space formed inside the main body portion 10 becomes the closed space S defined by the main body portion 10 and the end surface 2c of the composite material 2.

The main body portion 10 includes a first wall portion 11 configured to define the other end of the space defined inside in the Y axis direction (that is, an end on a side opposite to the opening). The first wall portion 11 is separated from the end surface 2c of the composite material 2 by a predetermined distance in a state in which the composite material 2 is placed in the repair device 1. The closed space S is formed between the first wall portion 11 and the end surface 2c of the composite material 2. A distance L1 (see FIG. 2) between the first wall portion 11 and the end surface 2c of the composite material 2 is set such that a pressure loss with respect to the resin 4 distributed in the closed space S does not excessively increase. In one example, the distance L1 is set to about 5 mm to about 10 mm. However, since the distance L1 is set to be a more suitable value depending on the length of the portion to be repaired 3 and the viscosity of the resin 4, the distance L1 is not limited to the aforementioned value.

Also, the main body portion 10 includes a second wall portion 12 that is bent substantially perpendicularly from one end of the first wall portion 11 in the Z-axis direction and then extends in the Y-axis direction and a third wall portion 13 that is bent substantially perpendicularly from the other end of the first wall portion 11 in the Z-axis direction and then extends in the Y-axis direction. The second wall portion 12 defines one end of the space defined inside the main body portion 10 in the Z-axis direction, and the third wall portion 13 defines the other end of the space in the Z-axis direction.

The main body portion 10 includes a fourth wall portion 14 that is bent substantially perpendicularly from one end of the first wall portion 11 in the X-axis direction and then extends in the Y-axis direction and a fifth wall portion (not illustrated) that is bent from substantially perpendicularly from the other end of the first wall portion 11 in the X-axis direction and then extends in the Y-axis direction. The fourth wall portion 14 defines one end of the space formed inside the main body portion 10 in the X-axis direction, and the fifth wall portion defines the other end of the space in the X-axis direction. Also, the fourth wall portion 14 and the fifth wall portion connect the second wall portion 12 to the third wall portion 13. An injection port 31 and a evacuate port 41, which will be described later, penetrate through the fourth wall portion 14. Also, a first groove 14a extending in the Z-axis direction is formed in end surfaces of the fourth wall portion 14 and the fifth wall portion on one side in the Y-axis direction. The first groove 14a is formed over the entire range in the Z-axis direction. An O-ring 25 (not illustrated), which will be described later, is accommodated in the first groove 14a.

The first wall portion 11, the second wall portion 12, the third wall portion 13, the fourth wall portion 14, and the fifth wall portion are integrally formed of a rigid member. The rigid member is a member with rigidity to such an extent that the member is not deformed when the resin supply portion 30 injects the resin 4 into the closed space S with a pressure, and examples of the rigid member include a metal member and a resin member. Also, "the member is not deformed" means that the member is not deformed to such an extent that the member cannot serve functions as the main body portion, and it is a matter of course that slight deformation is acceptable.

The securing portion 20 includes a first contact plate portion (first contact portion) 21 that is brought into surface contact with one surface 2a that is a plate surface of the composite material 2 on one side and a second contact plate portion (second contact portion) 22 that is brought into surface contact with the other surface 2b that is a plate surface of the composite material 2 on the other side. Also, the securing portion 20 includes a pressurizing portion 23 configured to pressurizes the first contact plate portion 21 in the direction of the one surface 2a of the composite material 2 and presses the second contact plate portion 22 in the direction of the other surface 2b of the composite material 2.

The first contact plate portion 21 and the second contact plate portion 22 extend substantially in parallel and are disposed so as to face each other. A distance by which the first contact plate portion 21 and the second contact plate portion 22 are separated from each other is set to be slightly larger than the thickness of the composite material 2 (the length in a plate thickness direction) such that the composite material 2 can be inserted between the first contact plate portion 21 and the second contact plate portion 22. In a state in which the composite material 2 is disposed between the first contact plate portion 21 and the second contact plate portion 22 and the pressurizing portion 23 does not pressurizes the first contact plate portion 21 and the second contact plate portion 22, the first contact plate portion 21 and the second contact plate portion 22 are brought into a state in which the first contact plate portion 21 and the second contact plate portion 22 are not in surface contact with the composite material 2 (or a state in which the first contact plate portion 21 and the second contact plate portion 22 are in slight contact with the composite material 2) as illustrated in FIG. 2. If the pressurizing portion 23 pressurizes the first contact plate portion 21 and the second contact plate portion 22 in this state, the first contact plate portion 21 and the second contact plate portion 22 are elastically deformed and are brought into contact with the composite material 2. Note that the first contact plate portion 21 and the second contact plate portion 22 may be brought into indirect contact with the composite material 2 via sheet-shaped sealing materials or the like.

The second contact plate portion 22 is a plate-shaped member that further extends in the Y-axis direction from an end portion of the third wall portion 13 of the main body portion 10 on one side in the Y-axis direction. The first contact plate portion 21 and the third wall portion 13 are integrally formed. Also, the second contact plate portion 22 is formed of a material that is the same as a material of the main body portion 10.

Second grooves 22a are formed at both end portions of the surface of the second contact plate portion 22, which is brought into contact with the composite material 2, in the X-axis direction as illustrated in FIG. 1. Each second groove 22a extends along the Y axis and is formed over substantially an entire region in the Y-axis direction. The other end of each second groove 22a in the Y-axis direction is connected to the other end of the first groove 14a in the Z-axis direction. In addition, a third groove 22b is formed at one end portion of the surface of the first contact plate portion 21, which is brought into contact with the composite material 2, in the Y axis direction as illustrated in FIGS. 1 and 2. The third groove 22b extends along the X axis and is formed over substantially an entire region in the X-axis direction. Each of both end portions of the third groove 22b in the X-axis direction is connected to one end of each second groove 22a in the Y-axis direction. In other words, the third groove 22b connects one ends of the two second grooves 22a on one side in the Y-axis direction.

The first contact plate portion 21 is a plate-shaped member that further extends in the Y-axis direction from an end portion of the second wall portion 12 of the main body portion 10 on one side in the Y-axis direction. The first contact plate portion 21 and the second wall portion 12 are integrally formed. Also, the first contact plate portion 21 is formed of a material that is the same as a material of the main body portion 10.

Fourth grooves (not illustrated) are formed at both end portions of the surface of the first contact plate portion 21, which is brought into contact with the composite material 2, in the X-axis direction. Each fourth groove extends along the Y axis and is formed over substantially the entire region in the Y-axis direction. The other end of each fourth groove in the Y-axis direction is connected to one end of the first groove 14a in the Z-axis direction. A fifth groove 21a is formed at one end portion of the surface of the first contact plate portion 21, which is brought into contact with the composite material 2, in the Y-axis direction. The fifth groove 21a extends along the X axis and is formed over substantially an entire region in the X-axis direction. Also, each of both end portions of the fifth groove 21a in the X-axis direction is connected to one end of the fourth groove in the Y-axis direction. In other words, the fifth groove 21a connects one ends of the two fourth grooves on one side in the Y-axis direction.

The O-ring 25 is accommodated and placed in each of the first groove 14a, the second groove 22a, the third groove 22b, the fourth groove, and the fifth groove 21a. The O-ring 25 accommodated and placed in each groove is integrally formed. The O-ring 25 seals a portion between the closed space S formed by the main body portion 10 and the composite material 2 and an outer space. Note that the O-ring 25 accommodated in each groove may be configured in any manner as long as it is possible to seal the portion between the closed space S formed by the main body portion 10 and the composite material 2 and the outer space and the O-ring 25 may be a separate element or may be an element obtained by connecting separate elements.

The pressurizing portion 23 pressurizes the first contact plate portion 21 in the direction of the one surface 2a of the composite material 2 and also pressurizes the second contact plate portion 22 in the direction of the other surface 2b of the composite material 2 as illustrated in FIG. 2. By the pressurizing portion 23 that pressurizes the first contact plate portion 21 and the second contact plate portion 22 and that presses the first contact plate portion 21 and the second contact plate portion 22 against the composite material 2, the composite material 2 is secured to the main body portion 10. Typical examples of a device used as the pressurizing portion 23 include a C-type clamp.

The resin supply portion 30 includes the injection port 31 inside which a flow path is formed and which penetrates through the fourth wall portion 14, and a resin supply device (not illustrated) configured to supply a resin for repair 4 to the closed space S via the injection port 31.

The injection port 31 is a cylindrical member with a central axis line extending along the X axis. A flow path through which the resin 4 can be distributed is formed inside the injection port 31. The flow path formed inside the injection port 31 communicates with the closed space S.

The resin supply device is adapted to be able to be connected to the injection port 31. The resin supply device is a device configured to inject the resin 4 into the closed space S via the injection port 31 with a predetermined pressure. In other words, the resin supply device is a device configured to inject the pressurized resin 4 into the closed space S. The resin supply device may be an electric device or a manual device. Examples of the electric device include a syringe dispenser controller compressor. Examples of the manual device include an injector-shaped device configured of a syringe and a piston.

The evacuate portion 40 includes a evacuate port 41 inside which a flow path is formed and which penetrates through the fourth wall portion 14, and a evacuate device (not illustrated) configured to cause air to be evacuated from the closed space S via the evacuate port 41.

The evacuate port 41 is a cylindrical member with a central axis line extending along the X axis. A flow path through which air can be distributed is formed inside the evacuate port 41. The flow path formed inside the evacuate port 41 communicates with the closed space S.

The evacuate device is adapted to be able to be connected to the evacuate port 41. The evacuate device is a device configured to cause air to be evacuated from the closed space S via the evacuate port 41. Examples of the evacuate device include a vacuum pump.

Note that although the injection port 31 and the evacuate port 41 are formed to be adjacent to each other in the fourth wall portion 14 in the embodiment, the embodiment is not limited to this configuration. For example, the injection port 31 may be formed in the fourth wall portion 14, and the evacuate port 41 may be formed in the fifth wall portion.

Next, a method for molding the main body portion 10, the first contact plate portion 21, and the second contact plate portion 22 will be described.

The main body portion 10, the first contact plate portion 21, and the second contact plate portion 22 according to the embodiment are integrally molded. Hereinafter, a member in which the main body portion 10, the first contact plate portion 21, and the second contact plate portion 22 are integrally molded will be referred to as a chamber. Examples of a method of molding the chamber include a molding method using a three-dimensional printer. It is necessary to create the chamber in accordance with the shape of the part to be repaired of the composite material 2, and for example, it is necessary to set a distance by which the first contact plate portion 21 and the second contact plate portion 22 are separated from each other to a distance in accordance with the plate thickness of the composite material 2. Therefore, although various sizes and shapes are required for the chamber, it is possible to mold a chamber with a size and a shape in accordance with any shape of the part to be repaired in a short period of time using the three-dimensional printer. Although minute working such as formation of grooves for accommodating the O-rings 25 in inner surfaces (facing surfaces) of the first contact plate portion 21 and the second contact plate portion 22 is required for the chamber, it is possible to perform molding in a short period of time even for minute working using the three-dimensional printer for molding.

Note that a method other than the method of performing molding using a three-dimensional printer may also be used as a method for molding the chamber. For example, the chamber may be machined from metal. Also, the chamber may be molded through injection molding or casting.

Next, a repair method for the composite material 2 using the repair device 1 according to the embodiment will be described.

If the composite material 2 formed by laminating a fiber-reinforced resin sheets receives impact on an end portion thereof in the direction that perpendicularly intersects the plate thickness direction, delamination may occur starting from the end surface 2c, and a gap may be generated between the layers. In other words, a damaged state may be caused. The repair device 1 according to the embodiment repairs the composite material 2 by injecting the resin 4 into such a portion to be repaired 3 such as a gap in the composite material 2.

[Placement Process]

Specifically, the repair device 1 is firstly placed relative to the composite material 2. More specifically, the repair device 1 is placed relative to the composite material 2 such that the first contact plate portion 21 faces the one surface 2a of the composite material 2, the second contact plate portion 22 faces the other surface 2b of the composite material 2, and the main body portion 10 covers the portion to be repaired 3 of the composite material 2 (covering process). At this time, the repair device 1 is placed such that a region, which is adjacent to a region that defines the closed space S, in the end surface 2c of the composite material 2 is brought into contact with surfaces of the fourth wall portion 14 and the fifth wall portion on one side in the Y direction (the surfaces in which the first groove 14a is formed). In other words, the region, which is adjacent to the region that defines the closed space S, in the end surface 2c of the composite material 2 is located at the position represented by the one-dotted dashed line in FIG. 1. In this manner, the repair device 1 is placed relative to the composite material 2 such that the closed space S is formed between the main body portion 10 and the end surface 2c of the composite material 2.

[Securing Process]

Next, the pressurizing portion 23 is used to pressurize the first contact plate portion 21 in the direction of the one surface 2a of the composite material 2 and also to pressurize the second contact plate portion 22 in the direction of the other surface 2b of the composite material 2. In this manner, the first contact plate portion 21 is brought into surface contact with the one surface 2a of the composite material 2, and the second contact plate portion 22 is brought into surface contact with the other surface 2b of the composite material 2. In this manner, the O-rings 25 accommodated in the second groove 22a and the third groove 22b are compressed between the second contact plate portion 22 and the composite material 2. Also, the O-rings 25 accommodated in the fourth groove and the fifth groove 21a are compressed between the first contact portion and the composite material 2. In this manner, the main body portion 10 is secured to the composite material 2.

[Air Evacuate Process]

Next, a suctioning pump is driven, and the air inside the closed space S is suctioned and thus evacuated by the evacuate port 41 to make the inside of the closed space S vacuum. Note that vacuum may not be a state in which no air is present (complete vacuum state) and may be such a state that the pressure in the closed space S is lower than the atmospheric pressure.

[Injection Process]

Next, the resin supply device is driven, and the resin for repair 4 is injected into the closed space S via the injection port 31. At this time, the resin supply device injects the resin 4 into the closed space S with a predetermined pressure. If the resin 4 is injected into the closed space S, the closed space S is filled with the resin 4, and the inside of the portion to be repaired 3 is also filled with the resin 4 from the closed space S. Since the composite material 2 is secured to the main body portion 10, the pressure in the closed space S increases if the resin 4 is further supplied from the resin supply portion 30 to the closed space S in a state in which the closed space S is filled with the resin 4. If the pressure in the closed space S increases, the pressure acts on the resin 4 flowing into the portion to be repaired 3. In this manner, the resin 4 suitably flows into the portion to be repaired 3.

[Detaching Process]

If the injection of the resin 4 is completed, then the repair device 1 is detached from the composite material 2. The resin 4, which has once been injected into the portion to be repaired 3, is not evacuated from the portion to be repaired 3 even before the resin 4 is cured. Therefore, the detaching process may be performed after the resin 4 is cured by waiting for the curing of the injected resin 4 or may be performed before the resin 4 is cured. In the detaching process, the pressurization performed by the pressurizing portion 23 is released, and the repair device 1 is then detached from the composite material 2. In a case in which the repair device 1 is detached after the resin 4 is cured, the resin 4 projecting from the end surface 2c of the composite material 2 (that is, the resin 4 cured in the closed space S) is then removed. Also, in a case in which the repair device 1 is detached before the resin 4 is cured, the resin 4 that has adhered to the end surface 2c of the composite material 2 is then wiped off. The resin 4 is cured after the resin 4 is wiped off. Since the resin 4 is cured with elapse of time, the curing of the resin 4 may be waited, or the curing of the resin 4 may be promoted through active heating or the like.

In this manner, the repair of the portion to be repaired 3 of the composite material 2 is ended.

According to the embodiment, the following effects and advantages are achieved.

In the embodiment, the resin 4 is injected into the closed space S between the main body portion 10 that is secured to the composite material 2 and covers the portion to be repaired 3 and the portion to be repaired 3 with a pressure. In this manner, the resin 4 suitably flows into the portion to be repaired 3 to the pressurization force. According to the embodiment, it is possible to facilitate the flowing of the resin 4 into the portion to be repaired 3 in this manner, thereby to fill the inside of the portion to be repaired 3 with the resin 4 and to repair the portion to be repaired 3 even when the portion to be repaired 3 of the composite material 2 is minute cracking, a gap, or the like having a shape into which the resin 4 is difficult to flow.

In the embodiment, the main body portion 10 is formed of the member with rigidity that is not deformed due to the pressure from the resin supply portion 30. In this manner, it is possible to inject the resin 4 into the closed space S with a pressure. By injecting the resin 4 into the closed space S with the pressure, it is possible to cause the pressure to act on the resin 4 that flows into the portion to be repaired 3 as described above and thereby to suitably fill the inside of the portion to be repaired 3 with the resin 4.

In the embodiment, the evacuate portion 40 configured to evacuate air from the closed space S to make the closed space S vacuum is provided. In this manner, it is possible to evacuate the air from the inside of the closed space S and the portion to be repaired 3. Therefore, it is possible to curb inhibition due to the air when the resin 4 is caused to flow into the portion to be repaired 3. Therefore, it is possible to more suitably fill the inside of the portion to be repaired 3 with the resin 4 and thereby to more suitably repair the portion to be repaired 3.

In the embodiment, the first contact plate portion 21 integrally provided with the main body portion 10 and the one surface 2a of the composite material 2 are brought into surface contact, and the second contact plate portion 22 integrally provided with the main body portion 10 and the other surface 2b of the composite material 2 are brought into surface contact. Therefore, it is possible to cause a pressure loss between the main body portion 10 and the composite material 2 to increase and thereby to curb leakage of the resin 4 from the portion between the main body portion 10 and the composite material 2.

Also, the pressurizing portion 23 pressurizes the first contact portion in the direction of the one surface 2a of the composite material 2 and pressurizes the second contact portion in the direction of the other surface 2b of the composite material 2. In other words, the securing portion 20 secures the composite material 2 to the main body portion 10 such that the composite material 2 is sandwiched between the first contact portion and the second contact portion. In this manner, it is possible to further curb leakage of the resin 4 from the portion between the main body portion 10 and the composite material 2.

In the embodiment, the sealing members are provided between the first contact portion and the one surface 2a of the composite material 2 and between the second contact portion and the other surface 2b of the composite material 2. In this manner, since the resin 4 that is about to leak from the portion between the main body portion 10 and the composite material 2 is blocked with the sealing material, it is possible to further curb leakage of the resin 4 from the portion between the main body portion 10 and the composite material 2.

According to the method of injecting the resin 4 using, for example, a vacuum bag or the like, operators are required to have proficiency, and differences in quality may occur depending on the respective operators. However, according to the embodiment, it is possible to standardize the operation since it is only necessary to inject the resin 4 into the closed space S formed of the main body portion 10 formed of a member with rigidity that is not deformed due to the pressure from the resin supply portion 30 using the resin supply device. In other words, it is possible to carry out the repair with constant quality regardless of the proficiency of the operators.

Second Embodiment

Next, a second embodiment of the invention will be described with reference to FIG. 3. Note that FIG. 3 illustrates a state in which the composite material 2 is not placed in the repair device 1.

A repair device 51 according to the embodiment is different from the repair device according to the first embodiment in an angle θ formed by the first wall portion 11, the second wall portion 52, and the third wall portion 53. Also, the repair device 51 according to the embodiment is different from the repair device according to the first embodiment in that operation portions 56 are provided at a first contact plate portion 54 and a second contact plate portion 55 instead of the pressurizing portion 23. Since the other configurations are substantially the same as the configurations in the first embodiment, the same reference numerals will be applied to the same members, and detailed description will be omitted. In addition, the composite material 2 provided with the portion to be repaired 3 is also similar to the composite material 2 in the first embodiment.

Figure 3:
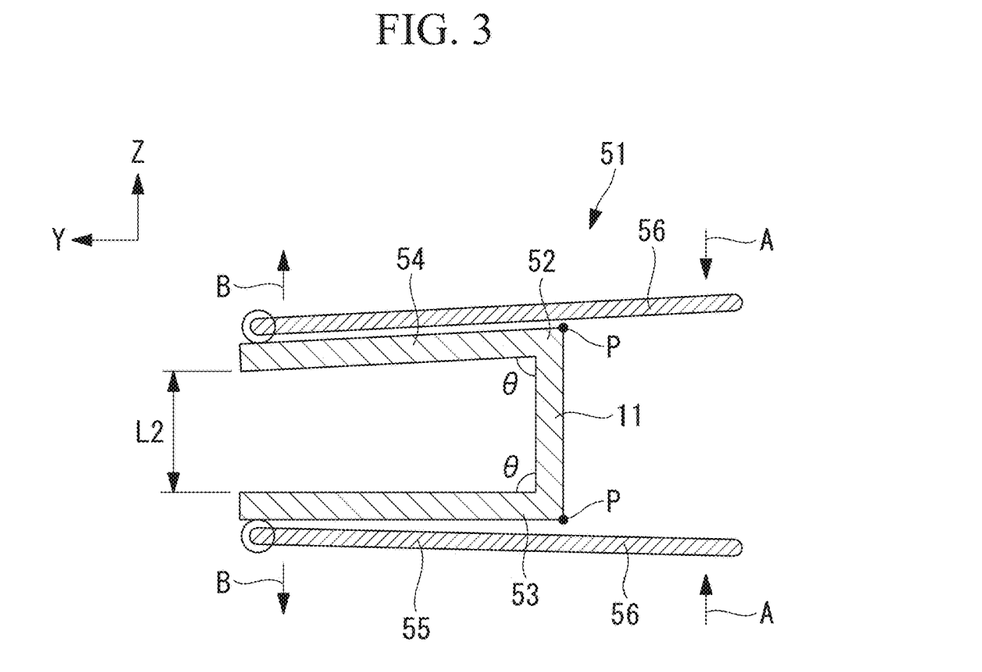
FIG. 3 is a vertical sectional view of a repair device according to a second embodiment of the invention.

In the repair device 51, the angle θ formed by the first wall portion 11, the second wall portion 52, and the third wall portion 53 is set to be smaller than 90 degrees as illustrated in FIG. 3. In this manner, the first contact plate portion 54 integrally formed with the second wall portion 52 and the third wall portion 53 and the second contact plate portion 55 are not disposed substantially in parallel and are disposed such that the first contact plate portion 54 and the second contact plate portion 55 approach one end side in the Y-axis direction. A distance L2 between a distal end of the first contact plate portion 54 and a distal end of the second contact plate portion 55 is set to be smaller than the plate thickness of the composite material 2.

A pair of operation portions 56 are secured to an outer surface of the first contact plate portion 54 (a surface on a side opposite to the surface that faces the composite material 2) and an outer surface of the second contact plate (a surface on a side opposite to the surface that faces the composite material 2). More specifically, each of the operation portions 56 is secured to one end portion of the outer surface of the first contact plate portion 54 in the Y-axis direction and one end portion of the outer surface of the second contact plate portion 55 in the Y-axis direction. Each of the operation portions 56 is a plate-shaped member that extends along the outer surfaces of the first contact plate portion 54 and the second contact plate portion 55, and one end is secured to the outer surfaces of the first contact plate portion 54 and the second contact plate portion 55. Also, the other end of each of the operation portions 56 is located on the other side in the Y-axis direction beyond the first wall portion 11.

Next, a repair method for the composite material 2 using the repair device 51 according to the embodiment will be described.

The repair method for the composite material 2 according to the embodiment is different from the repair method according to the first embodiment only in the placement process, the securing process, and the detaching process. Therefore, detailed description of the air evacuate process and the injection process, which are the same as the air evacuate process and the injection process in the first embodiment, will be omitted.

[Placement Process]

In the repair device 51 according to the embodiment, the distance L2 between the distal end of the first contact plate portion 54 and the distal end of the second contact plate portion 55 is smaller than the plate thickness of the composite material 2. Since it is not possible to insert the composite material 2 between the first contact plate portion 54 and the second contact plate portion 55 in this state, it is not possible to place the composite material 2 between the first contact plate portion 54 and the second contact plate portion 55. Thus, the other ends of the pair of operation portions 56 are operated first when the repair device 51 is placed relative to the composite material 2 according to the repair device 51 in the embodiment. More specifically, the pair of operation portions 56 are operated such that the other ends approach each other, as represented by the arrow A in FIG. 3. Through such an operation, by using corners of the operation portions 56 at rear ends of the main body portion 10 as support points P, ends in one side of the pair of operation portions 56 move such that the ends in the one side are separated from each other, as represented by the arrow B. Since ends in one side of the operation portions 56 are secured to one end portion of the main body portion, the main body portion 10 is elastically deformed with movement of the ends on the one side of the operation portions 56. More specifically, the main body portion 10 is elastically deformed such that the distance L2 between the distal end of the first contact plate portion 54 and the distal end of the second contact plate portion 55 increases. If the distance L2 is widened up to a distance by which the composite material 2 can be placed between the first contact plate portion 54 and the second contact plate portion 55, then the composite material 2 is placed between the first contact plate portion 54 and the second contact plate portion 55. Since a placement position and the like of the composite material 2 are similar to the placement position and the like in the first embodiment, detailed description will be omitted.

[Securing Process]

After the composite material 2 is placed, the operation of the operation portions 56 is released. If the operation of the operation portions 56 is released, a force of the first contact plate portion 54 and the second contact plate portion 55 acts to return to original shapes. In this manner, the first contact plate portion 54 is brought into a state in which the first contact plate portion 54 is in contact with the one surface 2a of the composite material 2 and is also biased on the side of the one surface. Also, the second contact plate portion 55 is brought into a state in which the second contact plate portion 55 is in contact with the other surface 2b of the composite material 2 and is also biased on the side of the other surface. In this manner, the main body portion 10 is secured to the composite material 2.

[Detaching Process]

In the detaching process, the pair of operation portions 56 are operated such that the other ends approach each other again, as represented by the arrow A in FIG. 3. Since the main body portion 10 is elastically deformed and the distance L2 between the distal end of the first contact plate portion 54 and the distal end of the second contact plate portion 55 is widened through such an operation, it is possible to detach the repair device 51 from the composite material 2.

According to the embodiment, the following effects and advantages are achieved.

In the embodiment as well, the first contact portion integrally provided with the main body portion 10 and the one surface 2a of the composite material 2 are brought into surface contact, and the second contact portion integrally provided with the main body portion 10 and the other surface 2b of the composite material 2 are brought into surface contact similarly to the first embodiment. Therefore, it is possible to cause a pressure loss between the main body portion 10 and the composite material 2 to increase and thereby to curb leakage of the resin 4 from the portion between the main body portion 10 and the composite material 2.

In the embodiment, the first contact portion is biased on the side of the one surface in a state in which the first contact portion is in contact with the one surface 2a of the composite material 2, and the second contact portion is biased on the side of the other surface in a state in which the second contact portion is in contact with the other surface 2b of the composite material 2. In other words, the securing portion 20 secures the composite material 2 to the main body portion 10 such that the composite material 2 is sandwiched between the first contact portion and the second contact portion. In this manner, it is possible to further curb leakage of the resin 4 from the portion between the main body portion 10 and the composite material 2 similarly to the first embodiment.

Also, no special device is provided in order to bring the first contact portion and the second contact portion into contact with the composite material 2 in the embodiment. Therefore, it is possible to reduce the number of components and to achieve a simple configuration as compared with a configuration in which a special device is provided from the viewpoint that the first contact portion and the second contact portion are brought into contact with the composite material 2.

Note that the invention is not limited to the invention according to the aforementioned respective embodiments and can appropriately be modified without departing from the scope of the invention.

For example, the angle θ that is formed by the first wall portion 11, the second wall portion 52, and the third wall portion 53 may be adjusted, and the first contact plate portion 54 and the second contact plate portion 55 may be biased on the side of the composite material 2 in the first embodiment as well similarly to the second embodiment. With such a configuration, it is possible to further curb leakage of the resin 4 from the portion between the main body portion 10 and the composite material 2 since the first contact plate portion 54 and the second contact plate portion 55 are brought into stronger surface contact with the composite material 2.

Although the example in which the angle θ that is formed by the first wall portion 11, the second wall portion 52, and the third wall portion 53 is set to be smaller than 90 degrees has been described in the aforementioned second embodiment, the invention is not limited to the configuration. It is only necessary for the angle θ to be set such that the angle in a state in which the composite material 2 is not placed in the repair device is smaller than the angle in a state in which the composite material 2 is placed in the repair device 1, and the angle θ may be set to be, for example, larger than 90 degrees.

Also, a heating mechanism (not illustrated) configured to heat the resin 4 with which the closed space S is filled may be provided at the main body portion 10 in each of the aforementioned embodiments. It is possible to enhance fluidity of the resin 4 by heating the resin 4 with which the closed space S is filled using the heating mechanism. Therefore, it is possible to promote the filling of the inside of the portion to be repaired 3 with the resin 4 and to promote curing of the resin 4 with which the inside of the portion to be repaired 3 is filled. Examples of the heating mechanism include a mechanism configured to perform heating by incorporating a nichrome wire inside the main body portion 10 and distributing electricity. A degree of heating performed by the heating mechanism is appropriately determined depending on properties of the resin 4 and heat resistance of the main body portion 10.

REFERENCE SIGNS LIST

1 Repair device
2 Composite material
2a One surface
2b Other surface
2c End surface
3 Portion to be repaired
4 Resin for repair
10 Main body portion
11 First wall portion
12 Second wall portion
13 Third wall portion
14 Fourth wall portion
14a First groove
20 Securing portion
21 First contact plate portion
21a Fifth groove
22 Second contact plate portion
22a Second groove
22b Third groove
23 Pressurizing portion
25 O-ring
30 Resin supply portion
31 Injection port
40 Evacuate portion
41 Evacuate port
51 Repair device
52 Second wall portion
53 Third wall portion
54 First contact plate portion
55 Second contact plate portion
56 Operation portion

What is claimed is:

1. A repair device that repairs a plate-shaped composite material formed by laminating fiber-reinforced resin sheets, the repair device comprising:
   a main body portion, which is a box-shaped member, configured to cover a portion to be repaired that is formed in an end surface of the composite material such that a closed space is formed between the end surface and the main body portion, the main body portion being spaced apart from the end surface;
   a securing portion provided to sandwich the composite material and configured to secure the main body portion to the composite material; and
   a resin supply portion provided in the main body portion and configured to inject a resin into the closed space with a pressure,
   wherein the main body portion is formed of a rigid member.

2. The repair device according to claim 1, further comprising:
   an evacuate portion provided in the main body portion and configured to evacuate air from the closed space to make the closed space vacuum.

3. The repair device according to claim 1,
   wherein the securing portion includes a first contact portion integrally provided with the main body portion and configured to be brought into surface contact with one surface that is a plate surface of the composite material on one side, a second contact portion integrally provided with the main body portion and configured to be brought into surface contact with the other surface of a plate surface of the composite material on the other side, and a pressurizing portion provided to sandwich the first contact portion and the second contact portion and configured to pressurize the first contact portion in a direction of the one surface of the composite material and pressurize the second contact portion in a direction of the other surface of the composite material.

4. The repair device according to claim 1,
wherein the securing portion includes a first contact portion integrally provided with the main body portion and configured to be brought into surface contact with one surface that is a plate surface of the composite material on one side and a second contact portion integrally provided with the main body portion and configured to be brought into surface contact with the other surface of a plate surface of the composite material on the other side, the first contact portion is biased on a side of the one surface in a state in which the first contact portion is in contact with the one surface of the composite material, and the second contact portion is biased on a side of the other surface in a state in which the second contact portion is in contact with the other surface of the composite material.

5. The repair device according to claim 3,
wherein sealing members are provided between the first contact portion and the one surface of the composite material and between the second contact portion and the other surface of the composite material.

6. The repair device according to claim 1, further comprising:
a heating mechanism incorporated in the main body portion and configured to heat the resin injected into the closed space.

7. A composite material repair method for repairing a plate-shaped composite material formed by laminating fiber-reinforced resin sheets, the method comprising:
a covering process of covering a portion to be repaired that is formed in an end portion of the composite material with a main body portion, which is a box-shaped member, formed of a rigid member such that a closed space is formed between the portion to be repaired and the main body portion;

a securing process of securing the main body portion to the composite material; and an injection process of injecting a resin into the closed space with a pressure after the covering process and the securing process.

\* \* \* \* \*